US010149311B2

(12) United States Patent
Hart et al.

(10) Patent No.: US 10,149,311 B2
(45) Date of Patent: Dec. 4, 2018

(54) CONSTRUCTING A SELF-ORGANIZING MESH NETWORK USING 802.11AD TECHNOLOGY

(71) Applicant: Google Inc., Mountain View, CA (US)

(72) Inventors: Michael J. Hart, San Jose, CA (US); Arunkumar Jayaraman, Cupertino, CA (US); Rajkumar Samuel, Cupertino, CA (US); Peter Gelbman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 235 days.

(21) Appl. No.: 14/953,587

(22) Filed: Nov. 30, 2015

(65) Prior Publication Data

US 2017/0156153 A1 Jun. 1, 2017

(51) Int. Cl.
| | |
|---|---|
| *H04W 72/12* | (2009.01) |
| *H04L 12/721* | (2013.01) |
| *H04L 12/751* | (2013.01) |
| *H04W 16/28* | (2009.01) |
| *H04W 76/10* | (2018.01) |
| *H04L 12/761* | (2013.01) |
| *H04W 84/12* | (2009.01) |
| *H04W 84/18* | (2009.01) |

(52) U.S. Cl.
CPC ............ *H04W 72/12* (2013.01); *H04L 45/02* (2013.01); *H04L 45/16* (2013.01); *H04L 45/72* (2013.01); *H04W 16/28* (2013.01); *H04W 76/10* (2018.02); *H04W 72/1278* (2013.01); *H04W 84/12* (2013.01); *H04W 84/18* (2013.01)

(58) Field of Classification Search
CPC ......... H04L 41/24; H04L 45/02; H04L 45/26; H04L 45/16; H04L 45/72; H04W 16/28; H04W 72/12; H04W 76/02; H04W 76/10
See application file for complete search history.

(56) References Cited

U.S. PATENT DOCUMENTS

| | | |
|---|---|---|
| 8,942,219 B2 | 1/2015 | Pratt, Jr. et al. |
| 2008/0139212 A1* | 6/2008 | Chen ................. H04W 72/1215 455/450 |

(Continued)

FOREIGN PATENT DOCUMENTS

WO WO-2014124024 A2 8/2014

OTHER PUBLICATIONS

International Search Report and Written Opinion for Application No. PCT/US2016/061797 dated Feb. 20, 2017.

*Primary Examiner* — Awet Haile
(74) *Attorney, Agent, or Firm* — Honigman Miller Schwartz and Cohn LLP

(57) ABSTRACT

A method includes receiving one or more node connections from a mesh network external to the data processing hardware. The mesh network includes a network of nodes each operative to transmit and/or receive directional beams containing packets of data. The method also includes identifying a route within the mesh network for providing a data packet from a source to a destination and determining schedule information associated with the identified route, the schedule information coordinating wireless communication between at least a first node and a second node along the route to transfer the data packet. The method also includes providing the schedule information to the first node and the second node.

30 Claims, 9 Drawing Sheets

(56) References Cited

U.S. PATENT DOCUMENTS

| | | |
|---|---|---|
| 2013/0155919 A1 | 6/2013 | Jung |
| 2014/0036724 A1 | 2/2014 | Castagnoli |
| 2014/0064261 A1* | 3/2014 | Wang .................... H04W 40/02 370/338 |
| 2015/0195836 A1* | 7/2015 | Malkin ................... H04L 47/14 370/329 |
| 2015/0230275 A1 | 8/2015 | Kerpez et al. |
| 2015/0334751 A1* | 11/2015 | Alanen ................ H04W 48/16 370/329 |
| 2016/0021581 A1* | 1/2016 | Deenoo ............. H04W 36/0055 370/331 |

* cited by examiner

CONSTRUCTING A SELF-ORGANIZING MESH NETWORK USING 802.11AD TECHNOLOGY

TECHNICAL FIELD

This disclosure relates to constructing self-organizing mesh networks using 802.11ad technologies.

BACKGROUND

The IEEE 802.11ad standard defines an interoperable physical (PHY) and Media Access Control (MAC) layer that may be used to enable point-to-multipoint communication between nodes within a network. Wireless chipset providers are developing Complementary metal-oxide-semiconductor (CMOS) based baseband and Radio Frequency Integrated Circuit (RFIC) solutions as part of an overall Wi-Fi chipset product offering to enable low cost and low power solutions instead of implementing proprietary protocols and technologies in either field-programmable gate array (FPGA) or as custom application specific integrated circuits (ASICs).

The IEEE 802.11ad standard, however, does not support multi-hop mesh network based topologies. Despite the 802.11 standard offering mesh support for other 802.11 MAC/PHY layers (e.g., 802.11a/b/g/n/ac), the IEEE 802.11ad standard is associated with a directional beaming channel environment, opposed to a broadcasting channel environment. Accordingly, the mesh protocol amendment (802.11s) developed for the 802.11 standard could not be extended to support the interoperable PHY and MAC layer associated with the 802.11ad standard.

SUMMARY

One aspect of the disclosure provides a method for operating a self-organizing mmWave mesh network. The method includes receiving, at data processing hardware, one or more node connections from a mesh network external to the data processing hardware. The mesh network includes a network of nodes each operative to transmit and/or receive directional beams containing packets of data. The method also includes identifying, using the data processing hardware, a route within the mesh network for providing a data packet from a source to a destination and determining, using the data processing hardware, schedule information associated with the identified route. The schedule information coordinates wireless communication between at least a first node and a second node along the route to transfer the data packet. The method further includes providing, using the data processing hardware, the schedule information to the first node and the second node.

Implementations of the disclosure may include one or more of the following optional features. In some implementations, providing the schedule information to the first node and the second node includes transmitting the schedule information from the data processing hardware to a first application layer associated with the first node and transmitting the schedule information from the data processing hardware to a second application layer associated with the second node. The first application layer may provide the schedule information to a first media access control layer associated with the first node and the second application layer may provide the schedule information to a second media access control layer associated with the first node. Providing the schedule information to the first node and the second node may also include transmitting the schedule information from the data processing hardware to a first application layer associated with the first node and instructing the first node to transmit the schedule information to the second node using a wireless communication link between the first media access control layer and a second media access control layer associated with the second node. The first application layer may provide the schedule information to a first media access control layer associated with the first node.

When the second node is disconnected from the mesh network, the method may include transmitting discovery instructions from the data processing hardware to a first application layer associated with the first node for discovering the second node. The received discovery instructions may cause a first media access control layer associated with the first node to: execute transmission of discovery frames to enable the second node operating in a station scanning mode to discover the first node; establish a wireless communication link with the second node when the second node discovers one or more of the discovery frames; and inform the first application layer to notify the data processing hardware that the wireless communication link is established between the first node and the second node. The first media access control layer may execute the transmission of discovery frames using a sector level sweep during one or more beacon transmission intervals specified by the discovery instructions.

When the wireless communication link is established between the first node and the second node, the method may include transmitting the schedule information from the data processing hardware to the first node and instructing, using the data processing hardware, the first node to transmit the schedule information to the second node. The scheduling information provided to the first node may specify a first transmission time period and instruct a first media access control layer associated with the first node to operate in a transmitter mode to transmit a first directional beam containing the data packet to the second node during the first transmission time period. The scheduling information provided to the second node may further specify a first receiving time period and instruct a second media access control layer associated with the second node to operate in a receiving mode to receive the first directional beam containing the data packet from the first node during the first receiving time period. The scheduling information provided to the second node may specify a second transmission period and instruct the second media access control layer to operate in the transmitter mode to transmit a second directional beam containing the data packet to a third node during the second transmission period after the second node receives the data packet from the first node.

In some examples, a software application layer associated with the second node inspects a destination address within the received data packet to determine a receiver address associated with the third node, and the second media access control layer may use the receiver address associated with the third node to transmit the second directional beam. The software application layer associated with the second node may also use the receiver address associated with the third node to select a transmitter address associated with an optimal sector of the second media access control layer for transmitting the second directional beam. The received data packet may include one of the following data frame formats: a first data frame format including the receiver address, a transmitter address, the destination address, and a source address in a same header; a second data frame format including the receiving address and the transmitter address in a 802.11ad header and the source address and the destination address included as a special header or in a special field of a payload portion; or a third data frame format including the destination address and the source address encapsulated in an aggregated-Media Access Control Service Data Unit.

In some examples, the scheduling information provided to the first node and the second node may specify a communication period for transferring the data packet between the first node and the second node. The first node and the second node may include media access control layers that contend with each other to determine which one of the first node or the second node will operate in a transmitter mode during the communication period. Media access control layers associated with the nodes of the mesh network may execute contention-based access period procedures when contending with other nodes in the mesh network. Media access control layers may also be associated with the nodes of the mesh network to update beam tracking to optimize multi-hop wireless communication links. In some examples, the scheduling information includes at least one of: a selected channel for transmitting the data packet associated each hop along the route; one or more beacon transmission intervals associated with each hop along the route; or communication periods for transferring the data packet between selected node pairs along the route.

Another aspect of the disclosure provides a system for operating a self-organizing mmWave mesh network. The system includes data processing hardware external to a mesh network and memory hardware in communication with the data processing hardware. The mesh network includes a network of nodes, each operative to transmit and/or receive directional beams containing packets of data. The memory hardware stores instructions that when executing on the data processing hardware cause the data processing hardware to perform operations including receiving one or more node connections from the mesh network, identifying a route within the mesh network for providing a data packet from a source to a destination, and determining schedule information associated with the identified route. The schedule information coordinates wireless communication between at least a first node and a second node along the route to transfer the data packet. The operations further include providing the schedule information to the first node and the second node.

This aspect may include one or more of the following optional features. In some implementations, providing the schedule information to the first node and the second node includes transmitting the schedule information from the data processing hardware to a first application layer associated with the first node and transmitting the schedule information from the data processing hardware to a second application layer associated with the second node. The first application layer may provide the schedule information to a first media access control. The second application layer may provide the schedule information to a second media access control layer associated with the first node. Providing the schedule information to the first node and the second node may also include transmitting the schedule information from the data processing hardware to a first application layer associated with the first node and instructing the first node to transmit the schedule information to the second node using a wireless communication link between the first media access control layer and a second media access control layer associated with the second node. The first application layer may provide the schedule information to a first media access control layer associated with the first node.

In some examples, when the second node is disconnected from the mesh network, the operations include transmitting discovery instructions from the data processing hardware to a first application layer associated with the first node for discovering the second node. The received discovery instructions may cause a first media access control layer associated with the first node to: execute transmission of discovery frames to enable the second node operating in a station scanning mode to discover the first node; establish a wireless communication link with the second node when the second node discovers one or more of the discovery frames; and inform the first application layer to notify the data processing hardware that the wireless communication link is established between the first node and the second node. The first media access control layer may execute the transmission of discovery frames using a sector level sweep during one or more beacon transmission intervals specified by the discovery instructions.

In some implementations, when the wireless communication link is established between the first node and the second node, the operations include transmitting the schedule information from the data processing hardware to the first node and instructing, using the data processing hardware, the first node to transmit the schedule information to the second node. The scheduling information provided to the first node may specify a first transmission time period and instruct a first media access control layer associated with the first node to operate in a transmitter mode to transmit a first directional beam containing the data packet to the second node during the first transmission period. The scheduling information provided to the second node may specify a first receiving time period and instruct a second media access control layer associated with the second node to operate in a receiving mode to receive the first directional beam containing the data packet from the first node during the first receiving time period. The scheduling information provided to the second node further may specify a second transmission period and instruct the second media access control layer to operate in the transmitter mode to transmit a second directional beam containing the data packet to a third node during the second transmission period after the second node receives the data packet from the first node.

A software application layer associated with the second node may inspect a destination address within the received data packet to determine a receiver address associated with the third node, and the second media access control layer may use the receiver address associated with the third node to transmit the second directional beam. The software application layer associated with the second node may use the receiver address associated with the third node to select a transmitter address associated with an optimal sector of the second media access control layer for transmitting the second directional beam. The received data packet may include one of the following data frame formats: a first data frame format including the receiver address, a transmitter address, the destination address, and a source address in a same header; a second data frame format including the receiving address and the transmitter address in a 802.11ad header and the source address and the destination address included as a special header or in a special field of a payload portion; or a third data frame format including the destination address and the source address encapsulated in an aggregated-Media Access Control Service Data Unit.

The scheduling information provided to the first node and the second node may specify a communication period for transferring the data packet between the first node and the second node. The first node and the second node may include media access control layers that contend with each other to determine which one of the first node or the second node will operate in a transmitter mode during the communication period. The media access control layers associated with the nodes of the mesh network may execute contention-based access period procedures when contending with other nodes in the mesh network. The media access control layers associated with the nodes of the mesh network may update beam tracking to optimize multi-hop wireless communication links. The scheduling information may include at least one of: a selected channel for transmitting the data packet associated each hop along the route; one or more beacon transmission intervals associated with each hop along the route; or communication periods for transferring the data packet between selected node pairs along the route.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
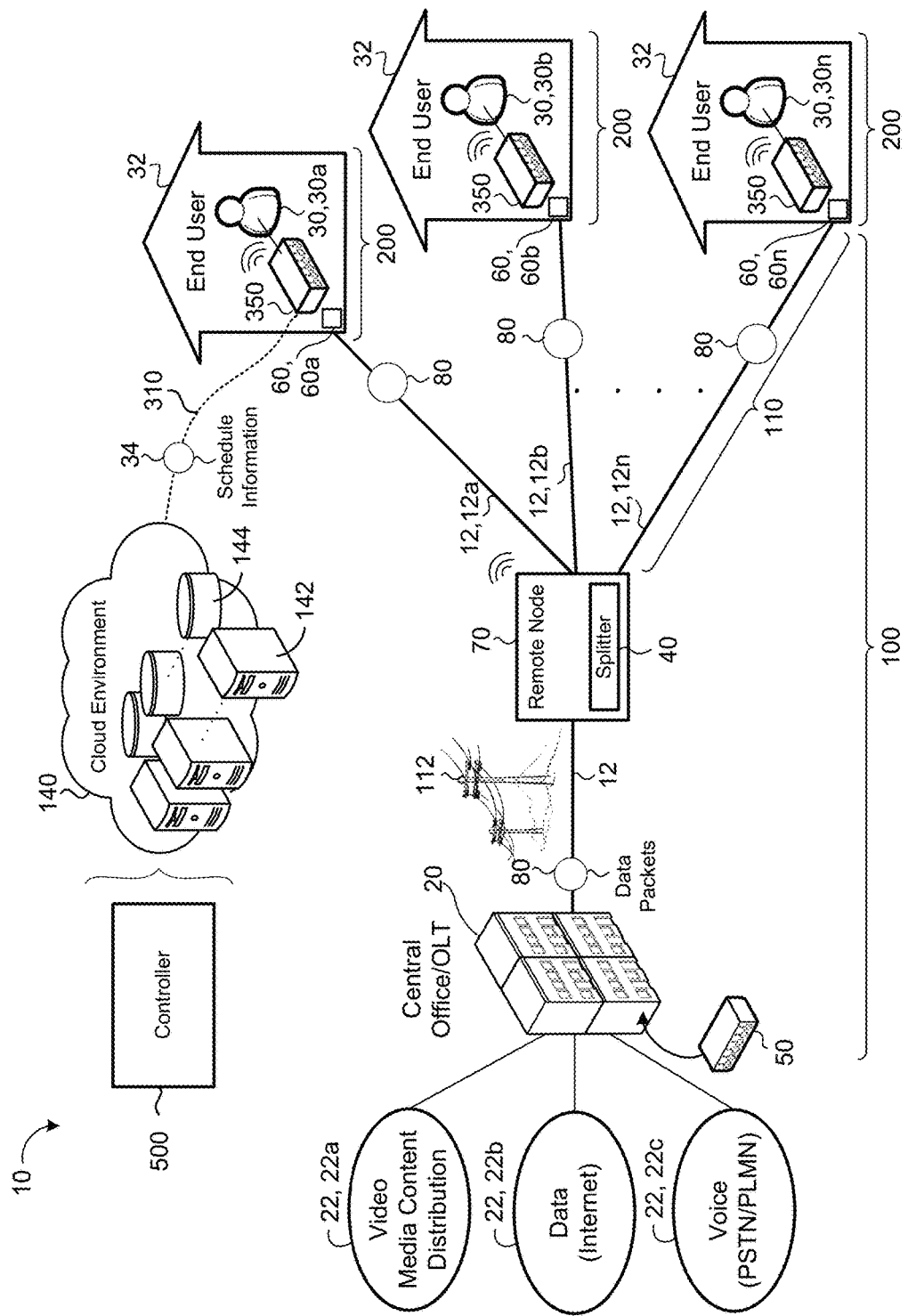
FIGS. 1A and 1B are schematic views of an exemplary network system.
Figure 1B:
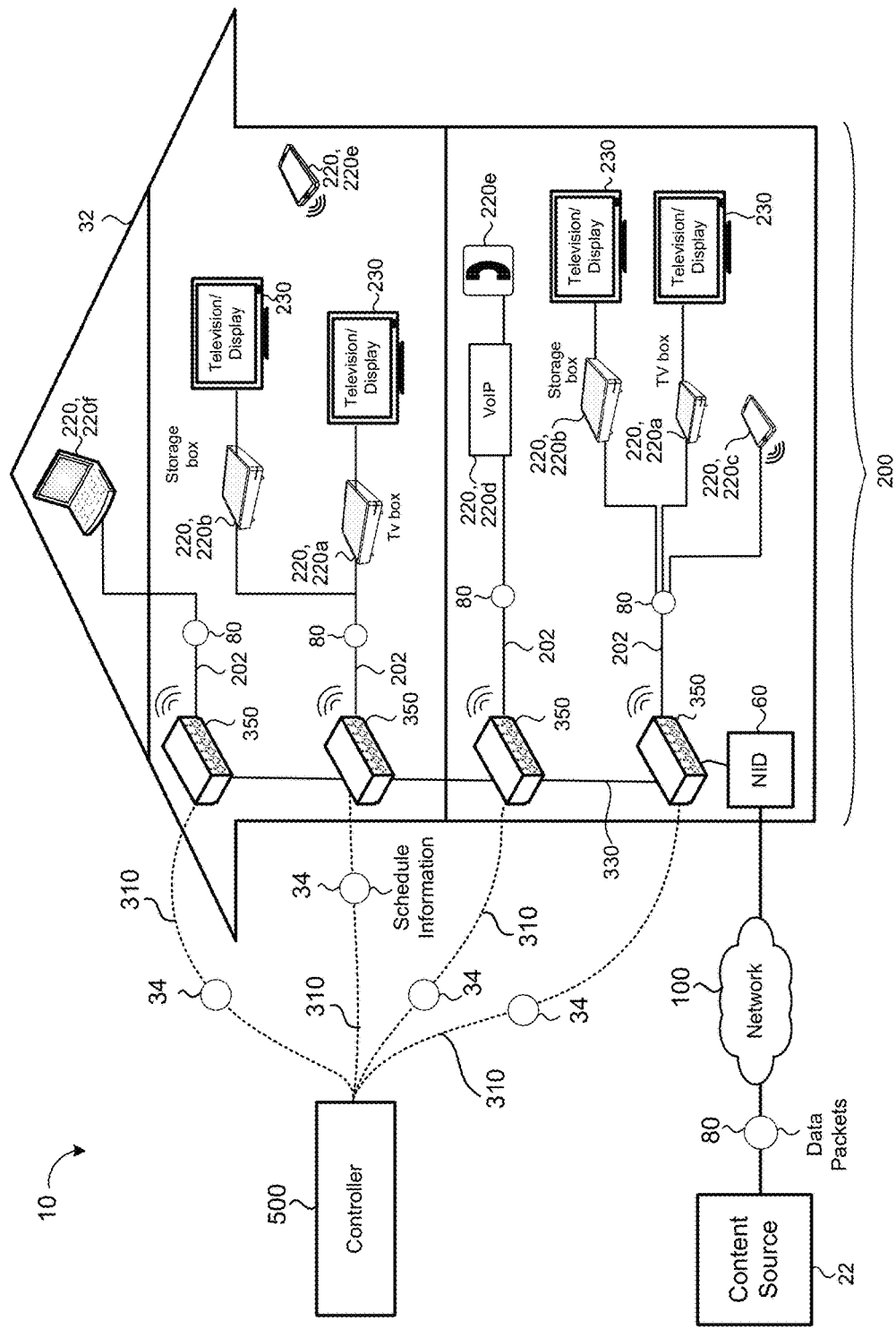

Referring to FIGS. 1A and 1B, in some implementations, a network system 10 includes a provider network 100 in communication with one or more residential networks 200 and a remote system 140. The remote system 140 may be a distributed system (e.g., cloud environment) having scalable/elastic resources 142 and storage resources 144.

The provider network 100 may include an optical network 100 (e.g., a passive optical network (PON) or a Gigabit-capable PON (GPON)) from a central office (CO) 20 (or optical line terminal (OLT)). Fiber-to-the home (FTTH) is the delivery of a communication signal through optical fibers 12, 12a-n over the optical network 100 from a central office (CO) 20 to the residential network 200 associated with a customer premises 32 (or structure) of a user 30 (also referred to as a customer). A passive optical network (PON) 100 is a point-to-multipoint network architecture that uses optical splitters 40 to enable a single optical fiber feeder 12 to serve multiple users 30a-30n (e.g. 16-128). Although the optical network 100 is described with respect to a passive optical network, an active optical network (AON) may be used as well.

The optical network 100 provides the optical fibers 12 for sending packets 80 of data from the CO 20 that includes an optical line terminal (OLT) 50 (e.g., optical transmitter/receiver or transceiver) to a number of network interface terminals (NITs) 60. The OLT 50 may be external to the CO 20 where the CO 20 feeds the OLT 50 using dedicated fiber runs. In some examples, the NITs 60 include optical network units/terminals (ONTs) 60. The CO 20 receives data from a content source 22, such as video media distribution 22a, internet data 22b, and voice data 22c, that may be transferred as packets 80 of data to the end users 30. Each NIT 60 may include an optical transmitter/receiver (i.e., transceiver) for transmitting and receiving data packets 80 from the CO 20. The NIT 60 may be a media converter that converts fiber-optic light signals to electric signals for communication over copper wires (e.g. Ethernet lines). In some examples, the optical network 100 includes multiple optical transmitter/receiver or transceiver systems 50, 60. One optical fiber 12 is sent from the CO 20 to a remote node 70, where the signal is split and distributed to many (e.g., 16, 205 or more) different NITs 60a-60n via optical fibers 12, 12a-12n. Multiple remote nodes 70 may split the signal. In some implementations, power lines 112, such as 110 VAC electric lines or from commonly available Cable Television (CATV) power supply lines, route the optical fibers 12 and provide power.

The examples show the OLT 50 as the endpoint of the optical network 100 by converting electrical signals used by equipment of a service provider to/from fiber-optic signals used by the optical network 100. In addition, the OLT 50 coordinates multiplexing between the conversion devices at the user end 30. The OLT 50 sends the fiber optic signal through a feeder fiber 12, and the signal is received by a remote node 70, which splices the signal and distributes it to multiple NITs 60 for demultiplexing before distribution to the end user 30.

The NIT 60, on the user end, converts an optical signal routing the packets 80 of data received from the OLT 50 (over the passive optical network 100) into an electrical signal and provides Layer 2 media access control functions for the residential network 200 associated with the end-user 30. The NIT 60 therefore functions as a media converter, converting the optical signal to an electrical signal, such as an Ethernet signal.

In some implementations, the residential network 200 is a mmWave mesh network including a meshed-based network of nodes 350 (e.g., routers directing packets 80 of data along one or more wireless communication links 330). The nodes 350 may wirelessly communicate with one another using IEEE 802.11ad (hereinafter 802.11ad) technology to transfer the packets 80 of data in multiple hops over the connected links 330. Accordingly, the nodes 350 of the mesh network 200 facilitate the transfer of data packets 80 from a source 210 (FIG. 2) to a destination 220 (e.g., electronic device) associated with the user 30. The nodes 350 may be equipped with multiple Internet protocol (IP) interfaces. In some implementations, the NIT 60 are integrated with one of the nodes 350 as a single optical network-residential gateway device of the residential network 200. The nodes 350 may wirelessly communicate with one another via 802.11ad technology through the connected links 330 to offer Wi-Fi throughout the mesh network 200. Therefore, the nodes 350 serve as routers to provide the packets 80 of data over multiple hops from the source 210 to the devices 220 located within a limited area 32 (e.g., house, office building, etc.).

In some implementations, the mesh network 200 is a local area network (LAN) (e.g., a home area network (HAN)) that facilitates communication and interoperability among electronic devices 220 within a limited area 32, such as a user's 30 home, school, or office. An electronic device 220 may be a TV box 220a, a storage box 220b, a tablet 220c, a voice-over-internet protocol (VoIP) device 220d, a phone or smartphone 220e, a computer 220f (or a laptop, a portable electronic device), etc., each of which may be connected via Wi-Fi or have a wired connection 202 to one or more nodes 350. In other implementations, the mesh network 200 is a wide area network (WAN), such as a metropolitan area network (MAN), that facilitates communication and interoperability among end points including some mixture of wireless devices 220 and/or wireless access points providing public Wi-Fi or LTE throughout a neighborhood or metropolitan area.

The IEEE 802.11 standard supports multi-hop mesh topologies for nodes having media access control (MAC) and physical (PHY) layers associated with broadcasting channel environments, such as 802.11a/b/g/n/ac. Each node operates in a station mode (e.g., STA) and communicates with an access point (AP) or personal basic service set (PBSS) control point (PCP) located within the network 100. The PCP may communicate with the STAs and determine when the STAs may utilize a broadcast medium. The AP/PCP acts as a supervisor to inform each STA of opportunities to communicate with the AP/PCP or with other STAs. However, common off the shelf wireless chipsets implementing the 802.11ad standard do not support multi-hop mesh topologies due to their interoperable MAC and PHY layers 306, 308 (FIGS. 3A-3F) providing a channel environment through directional beaming. As a result, the MAC and PHY layers 306, 308 for nodes 350 using 802.11ad technology do not communicate directly with an AP/PCP located within the network to coordinate wireless communication between the nodes 350. Instead, the functionality of the AP/PCP may reside within the remote system 140, a software application layer 302 (FIG. 2) of the node 350, or a combination thereof to facilitate the formation, management, and routing of packets 80 through multi-hop mmWave mesh topologies.

In some implementations, the nodes 350 of the mesh network 200 establish node connections 310 with the remote system 140 through the provider network 100 or other communications. In some examples, the remote system 140 executes a controller 500 that manages end-to-end routing of traffic (e.g., data packets 80) through the mesh network 200 based on conditions of the mesh network 200. For example, the controller 500 may identify one or more routes 201, 202 (FIG. 2) through the mesh network 200 for providing a data packet 80 from a source 210 (FIG. 2) to a destination (220), determine schedule information 34 that coordinates wireless routing of the data packet 80 over multiple hops along the route 201, 202, and provide the schedule information 34 to one or more of the nodes 350 along the route 201, 202.

Figure 2:
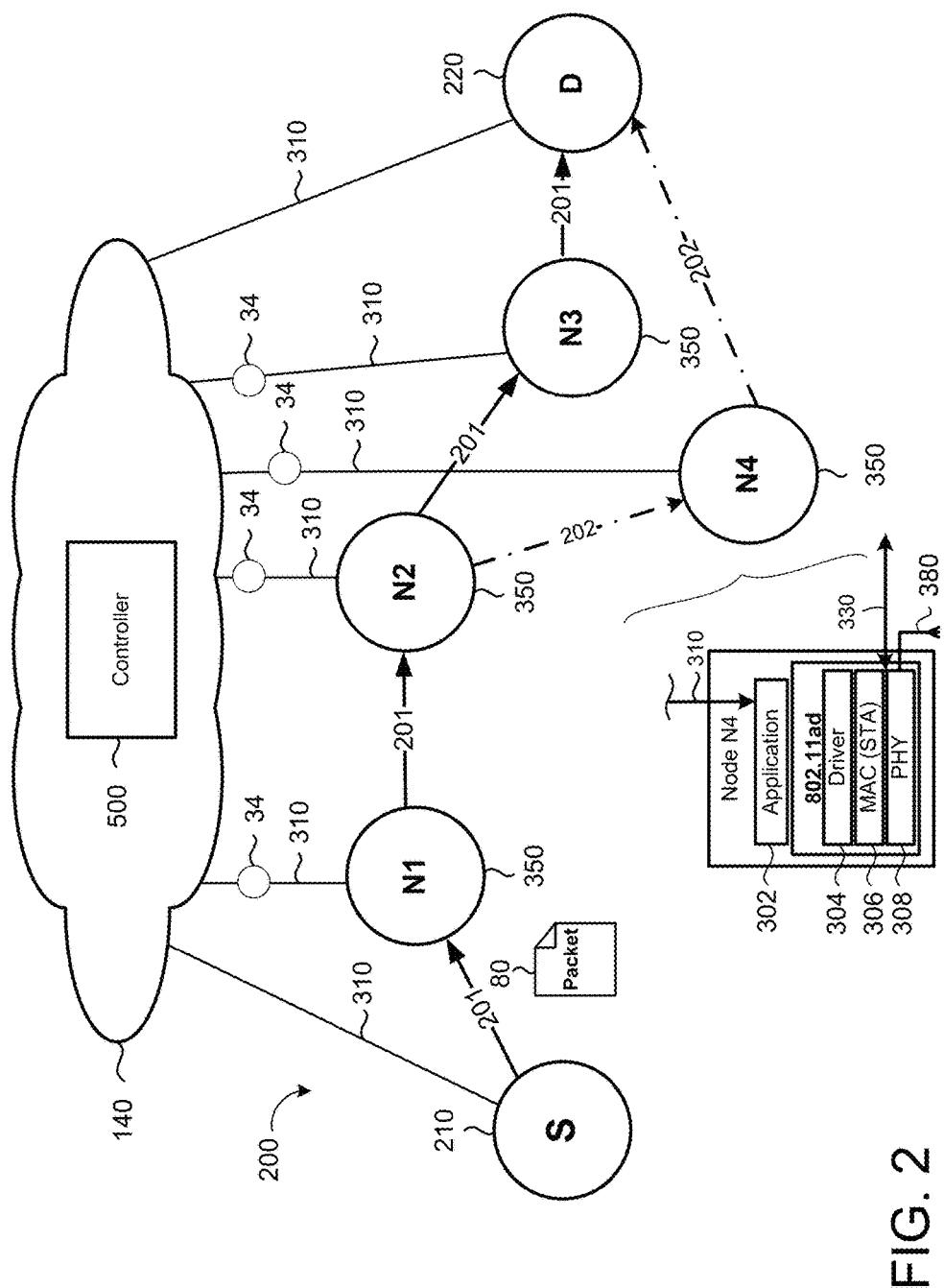
FIG. 2 is a schematic view of an exemplary network system including a mesh network and a cloud-based controller that identifies a route within the mesh network for directing a data packet from a source to a destination.

Referring to FIG. 2, in some implementations, the controller 500 executing on the remote system 140 (e.g., the cloud) receives one or more node connections from a mesh network 200 (e.g., multi-hop mmWave mesh network) external to the remote system 140. The network includes a network of nodes 350 (N1-N4) each operative to transmit and/or receive directional beams containing packets 80 of data. The nodes 350 include IEEE 802.11ad wireless chipsets and operate in the STA mode. The mesh network 200 does not include an AP/PCP that communicates with the nodes 350 to inform the nodes 350 when to communicate with one another. Instead, the AP/PCP functionality resides within the controller 500 executing on the remote system 140 (e.g., cloud environment) to enable the controller 500 to identify one or more routes 201, 202 within the mesh network 200 for providing a data packet 80 from the source 210 to the destination 220. The source 210 may include an originating node 350 or may include the NIT 60 (FIGS. 1A-1B) and the destination 220 may include an end recipient electronic device 220a-n of the data packet 80. The destination 220 may also correspond to a terminating node 350 along the route 201, 202. By implementing the AP/PCP functionality within the controller 500, the controller 500 may determine the schedule information 34 to coordinate wireless communication between pairs of nodes along the identified route 201, 202 to transfer the data packet 80 from the source 210 to the destination 220 through multiple hops.

FIG. 2 shows the controller 500 receiving node connections 310 from each node 350 (N1-N4) of the mesh network 200. The source S 210 and the destination D 220 may be associated with nodes and may communicate with the controller 500 via associated node connections 310. Based upon conditions of the mesh network 200, the controller 500 may identify one or more routes 201, 202 for transferring the data packet 80 from the source 210 to the destination 220. The first route 201 includes the source S 210, the first node N1 350, the second node N2 350, the third node N3 350, and the destination D 220. The second route 202 includes the second node N2 350, the fourth node N4 350, and the destination D 220. In some examples, the controller 500 may identify the second route 202 when conditions associated with the first route 201 change. For example, the controller 500 may determine high interference between the second and third nodes N2, N3 350, and decide to utilize the second route 202 to transfer the data packet 80 from the second node N2 to the fourth node N4 and on to the destination D 220.

The controller 500 may utilize the node connections 310 to provide the scheduling information 34 to the nodes N1-N4. The nodes 350 may initially operate in the STA mode and then operate in one of a transmitter mode or a receiving mode to communicate with another node 350 during a communication period specified by the scheduling information 34. For instance, the scheduling information 34 provided to the first node N1 350 may specify a transmission period (e.g., communication period) and instruct the first node N1 350 to transmit a directional beam containing the data packet 80 to the second node N2 350 during the transmission period. Similarly, the scheduling information 34 provided to the second node N2 350 may specify a receiving period and instruct the second node N2 350 to receive the directional beam containing the data packet 80 from the first node 350 during the receiving period.

In some implementations, each node 350 includes a software application layer 302 (e.g., host), a driver layer 304, a MAC layer 306, and a PHY layer 308. The driver, the MAC, and the PHY layers 304, 306, 308 may reside on a Wi-Fi chip using 802.11ad technology. The software application layer 302 facilitates wireless communication with the controller 500 via the node connection 310 to enable the controller 500 to transmit the scheduling information 34 to the associated node 350. In some examples, the driver layer 304 runs on the host with the software application layer 302 and includes some of the upper MAC layer 306 functionality, such that the overall MAC layer 306 functionality may be split between the driver layer 304 on the host and firmware of the node 350. The software application layer 302 may forward the scheduling information 304 received from the controller 500 to the MAC layer 306 while the node 350 operates in the STA mode. In some examples, the software application layer 302 updates the scheduling information 34 and forwards the updated scheduling information 34 to the MAC layer 306. Optionally, the MAC layers 306 associated with a pair of nodes 350 may communicate with one another via a wireless communication link 330 such that one node may transmit frames to the other node to inform the other node 350 of the scheduling information 34. The PHY layer 308 may include one or more antennas 380 to transmit a directional beam to a designated node and/or receive a directional beam from another node. In some examples, the PHY layer 308 includes an antenna array of two or more antennas 380 to form the directional beams. The MAC layer 306 may communicate with the PHY layer 308 to execute beam training to determine optimal beams for transmitting to a receiving node. The MAC layers 306 associated with a pair of nodes 350 may execute a beam refinement protocol (BRP) to optimize the communication link 330 between the pair of nodes 350. The application software layer 302 may direct the MAC/PHY layers 306, 308 to execute the beam training and the BRP procedures. The MAC layer 306 may report back to the application software layer 302 the results of the beam training (e.g., a sector level sweep) and/or BRP for use by application software layer 302 in making subsequent decisions. In communication with the application software layer 302, the controller 500 determines optimal routing information based on link level statics (e.g., a lot of beam training events or degraded links). Here, the controller 500 may designate other links for robust routing when a given link is associated with low reliability or only route certain low QoS frames/packets 80 over such a link associated with some level of unreliability.

The controller 500 and/or the software application layer 302 of each node 350 may structure beacon intervals in terms of what periods are present and which nodes 350 (operating in the STA mode) are given allocations for wireless communication during the appropriate periods. Moreover, the controller 500 and/or the software application layer 302 of each node 350 provide spectrum management for the identified route 201, 202 by selecting appropriate channels, mitigating interference, and/or providing time and spatial management of radio resource utilization across the mesh network 200. On the other hand, the MAC layer 306 of each node 350 may be responsible for link adaptation, including adapting a modulation structure (MCS) used and beam tracking based on the channel condition. Generally, beam tracking is directed to the MAC layer 306 by the application software layer 302. Moreover, the MAC layer 306 of each node 350 may implement a contention-based access period (CBAP) procedure when the associated node 350 is contending with other nodes 350 for access to the network 200 during a particular period allocated by the controller 500. Accordingly, the controller 500 and software application layers 302 optimize the end-to-end routing of traffic based on network conditions, while the MAC layers 306 may rapidly adapt the communication links 330 based on changing channel conditions without the latency of centralizing these functions at the controller 500.

Figure 3A:
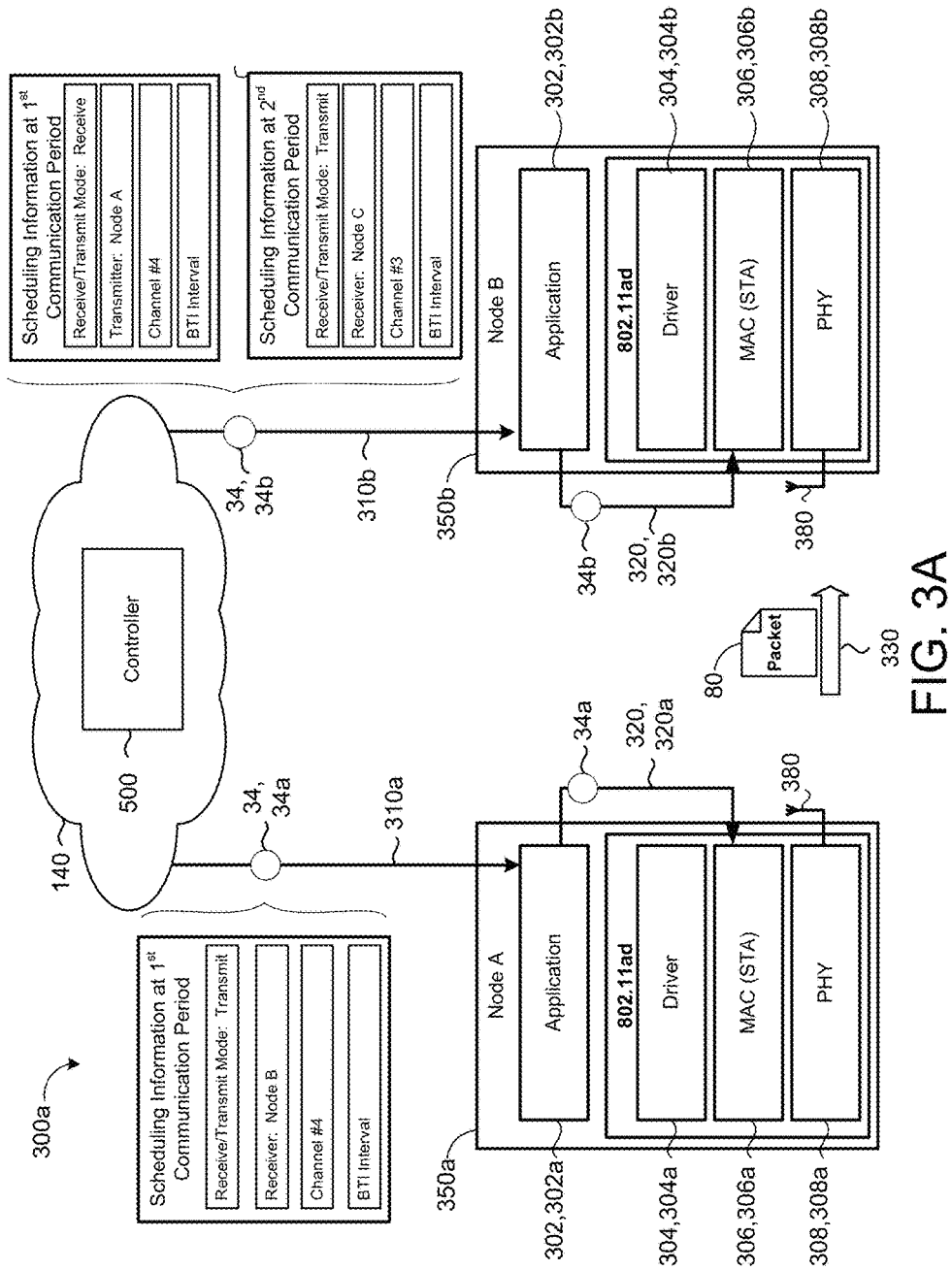
FIG. 3A is a schematic view of a controller providing schedule information to a first node and a second node of a mesh network for transferring a data packet therebetween.

Referring to FIG. 3A, schematic view 300a shows the controller 500 executing in the cloud environment 140 and providing scheduling information 34, 34a-b to a first node 350a (Node A) and a second node 350b of a mesh network 200 to coordinate the wireless communication of a data packet 80 from the first node 350a to the second node 350b. The controller 500 provides the scheduling information 34a to the first node 350a by transmitting the scheduling information 34a directly to a first software application layer 302, 302a of the first node 350a via the node connection 310a. The first software application layer 302a then forwards the scheduling information 34a to a first MAC layer 306a associated with the first node 350a. The controller 500 similarly provides the scheduling information 34a to the second node 350b by transmitting the scheduling information 34b directly a second software application layer 302, 302b of the second node 350b via the node connection 310b. The second software application layer 302b then forwards the scheduling information 34b to a second MAC layer 306a associated with the second node 350a. In some examples, when the node connection 310b is not provided between the controller 500 and the second application layer 302b, the controller 500 transmits the scheduling information 34b to the first software application layer 302a to instruct the first media access control layer 306a to transmit the schedule information 34b to the second node 350b using a wireless communication link 330 between the first MAC layer 306a and the second MAC layer 306b.

The scheduling information 34a provided to the first node 350a may specify a first communication period to inform the first node 350a to operate in a transmit mode for transmitting the data packet 80 to a specified receiver (e.g., Node B 350b) during the first communication period. The first communication period may be a transmission period associated with the first node 350a. The scheduling information 34a may further specify the channel (e.g., Channel #4) and the beam transmission interval (BTI) for transmitting a directional beam containing the data packet 80. The first software application layer 302a of the first node 350a may forward the scheduling information 34a to the first MAC layer 306 via a first communication path 320, 320a.

The scheduling information 34b provided to the second node 350b may specify the first communication period to inform the second node 350b to operate in a receiver mode for receiving the data packet 80 from a specified transmitter (e.g., Node B 350a) during the first communication period. The first communication period may be a receiving period associated with the second node 350b. The scheduling information 34b may further specify the channel and BTI. The second software application layer 302b of the second node 350b may forward the scheduling information to the second MAC layer 306b via a second communication path 320, 320b.

In some implementations, upon receiving scheduling information 34a, 34b, the MAC layers 306a, 306b execute in the associated transmitter mode or receiver mode to execute beam tracking during the BTI to determine an optimal directional beam (e.g., wireless communication link 330) for transmitting the data packet 80 from the first node 350a to the second node 350a. Specifically, the PHY layers 308a, 308b of the nodes 350a, 350b may employ one or more antennas 380 to transmit and receive the directional beam containing the data packet 80. In some examples, when the scheduling information 34a, 34b does not specify which node 350a, 350b operates in the transmitter mode and which node 350a, 350b operates in the receiving mode during the first communication period, the MAC layers 306a, 306b contend with each other to determine which node 350a is the transmitter and which node 350b is the receiver.

FIG. 3A also shows the scheduling information 34b provided to the second node 350b specifying a second communication period to inform the second node 350b to operate in a transmitter mode for transmitting a second directional beam containing the data packet 80 to a specified receiver (e.g., Node C 350c (FIG. 3B) during the second communication period associated with a next hop.

In some scenarios, a wireless communication link 330 between two nodes 350 (e.g., node 350a, 350b) becomes lost. For instance, one of the nodes 350 may be moved to a different location within the mesh network 200. In some implementations, the first software application layer 302a (or 302b) detects when the communication link 330 between the first node 350a and the second node 350b is lost. In these implementations, the first software application layer 302a communicates directly with the second software application layer 302b of the second node 350b (and/or other nodes 350 in the vicinity of the first node 350b) to restore the wireless communication link 330 between the first node 350a and the second node 350b.

Figure 3B:
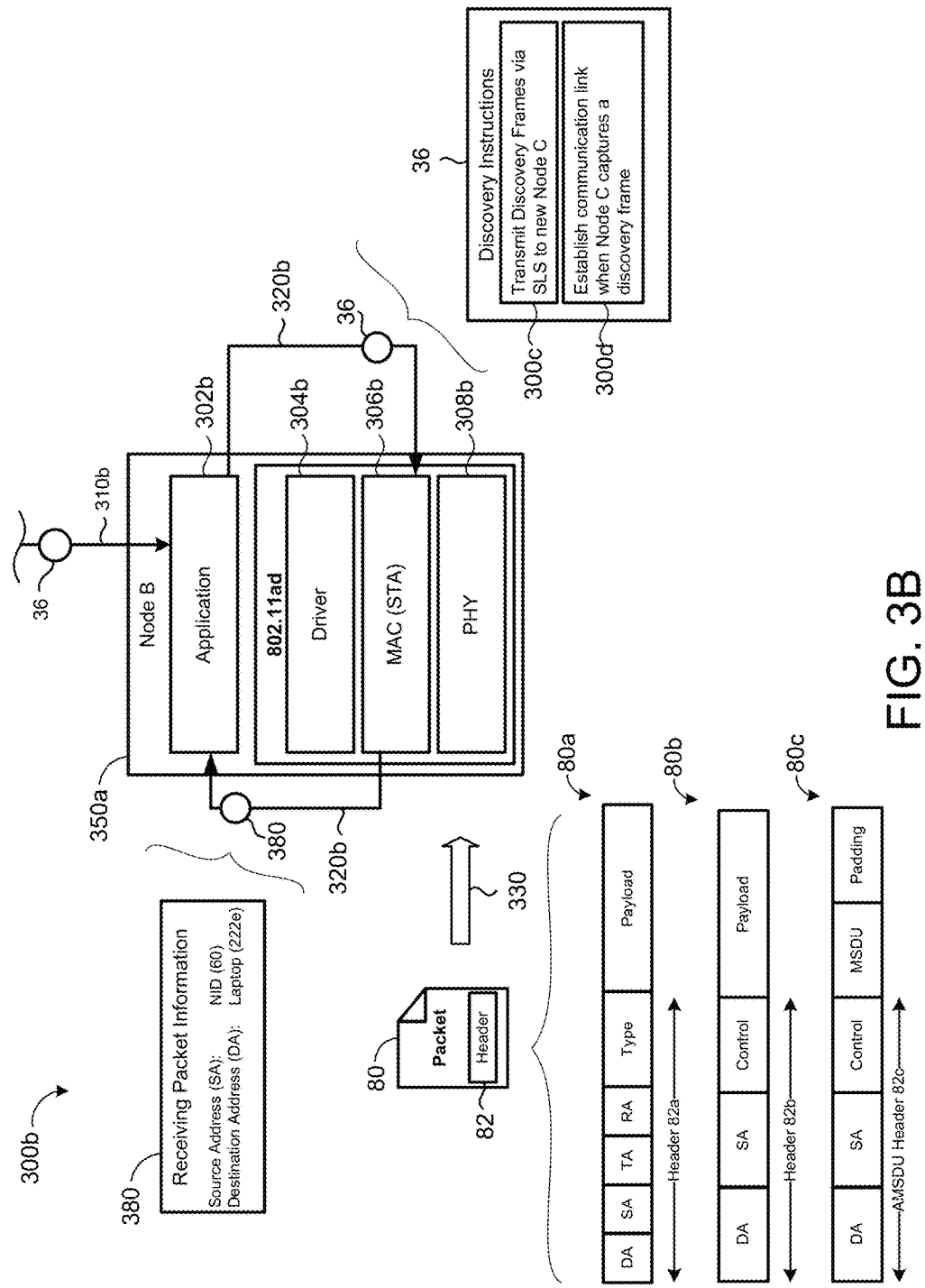
FIG. 3B is a schematic view of a first node transferring a data packet to a first node and a controller providing discovery instructions to the second node for discovering a new third node introduced to a mesh network.

Referring to FIG. 3B, a schematic view 300b shows the second node 350b receiving the directional beam containing the data packet 80 from the first node 350a via the communication link 330. To enable multi-hop routing of the data packet 80 between each pair of nodes 350, a four address format is required to include a destination address (DA), a source address (SA), a transmitter address (TA), and a receiver address (RA).

The second MAC layer 306b (while operating in the STA mode) receives the data packet 80 including a header 82 to determine receiving packet information 380 associated with the data packet 80 received via the hop from the first node 350a to the second node 350b. The received data packet 80 may include a data frame format 80a, 80b, 80c. As used herein, the term "packet" refers to a formatted block of information carried by the mesh network 200 and the term "frame" refers to an encoded packet of fixed or variable length. As used herein, the terms "frame" and "packet" are used interchangeably.

In some examples, the data packet 80 is associated with a first data frame format 80a including a MAC data header 82a and a payload field 84 including payload information. The first data frame format 80a may include a mesh data frame format supported by meshed-based topologies. The MAC data header 82a may include a Type field and four address fields indicating the DA, the SA, the TA and the RA, where the TA is associated with the second node 350a and the RA is associated with the third node 350b. Accordingly, the second MAC layer 306b may update the header 82a to include the RA associated with the third node for transmitting the data packet 80 to the third node 350c during the second communication period associated with the next hop. In other configurations, when the MAC layer 306b does support a bridging/forwarding function, the second software application layer 302b will receive the first data frame format 80a including the TA associated with the first node 350a and the RA associated with the second node 350b, and then inspect the DA and determine the appropriate RA associated with the third node 350c. In these configurations, the second software application layer 302b also determines the TA of the appropriate sector at the second node 350b for transmitting/forwarding the data packet 80a. The frame 80a is then passed to the MAC layer 306c of the appropriate sector for processing and transmission.

In some examples, the data packet 80 is associated with a second data frame format 80b including an internal header 82b and a payload field including payload information. The internal header may include a control field and two address fields indicating the DA and the SA. The DA corresponds to an electronic device 220 while the SA corresponds to the NIT 60 (FIGS. 1A and 1B). Accordingly, the receiving packet information 380 may only include the SA and the DA, requiring the second node 350b to determine the RA associated with the third node 350b for use when transmitting the data packet 80 during the next hop. In some examples, the second MAC layer 306b provides the receiving packet information 380 to the second software application layer 302b via the communication path 320b, and the second software application layer 302b inspects the DA within the received packet information 380 to determine the RA associated with the third node 350b. Thereafter, the second software application layer 302b routes the determined RA associated with the third node 350b back to the second MAC layer 306b for use when transmitting the second directional beam to the third node 350b. In some examples, when the second MAC layer 306b include multiple sectors, the second software application layer 302b uses the RA associated with the third node 350b to select a transmitter address (TA) associated with an optimal one of the sectors of the second MAC layer 306b for transmitting the second directional beam to the third node 350c.

In some examples, the data packet 80 is associated with a third data frame format 80c using MAC Service Data Unit (MSDU) aggregation. The third data frame format 80c includes an aggregated-MSDU (AMSDU) header 82c, a MSDU field, and padding. The AMSDU header 82c includes a Control field and two address fields indicating the DA and the SA. As with the second data frame format 80b, the receiving packet information 380 only includes the SA and the DA, requiring the second software application layer 302b to inspect the DA within the received packet information 380 to determine the RA associated with the third node 350b.

In some implementations, the third node 350c is disconnected from the mesh network 200. For example, the third node 350c may be a new node that the controller 500 is aware of but not discovered by the other nodes 350. Accordingly, the controller 500 is not connected to with the third node 350c, and therefore, is unable to transmit schedule information 34c, 34 to the third node 350c. Under these scenarios, the controller 500 transmits discovery instructions 36 via the node connection(s) 310 to one or more nodes 350 connected to the controller 500 for discovering the new node 350 (e.g., the third node 350c). FIG. 3B shows the second software application layer 302b of the second node 350b receiving the discovery instructions 36 via the node connection 310b for discovering the third node 350c. The first software application layer 302b provides the discovery instructions 36 to the second MAC layer 306b via the communication path 320b, and the discovery instructions 36 cause the second MAC layer 306b to execute transmission of discovery frames 382 (FIG. 3C) to enable the third node 350c to discover the second node 350b.

Figure 3C:
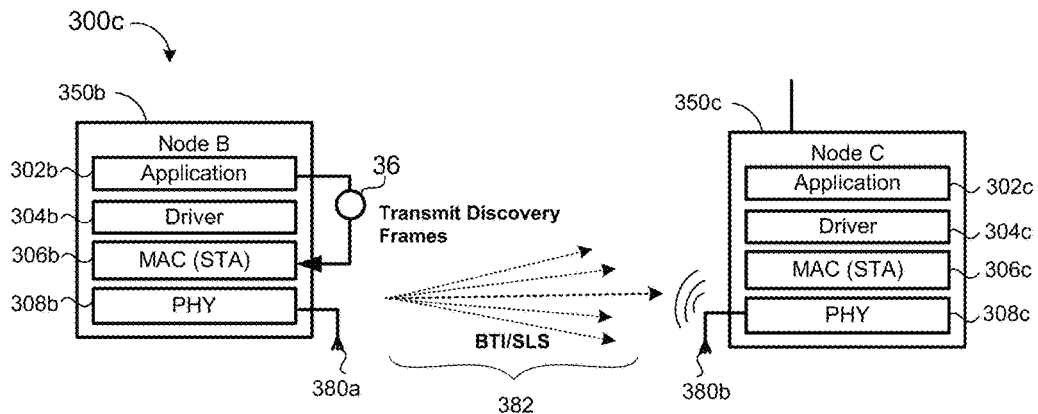
FIG. 3C is a schematic view of a second node transmitting discovery frames to discovery a new third node within a mesh network.
Figure 3D:
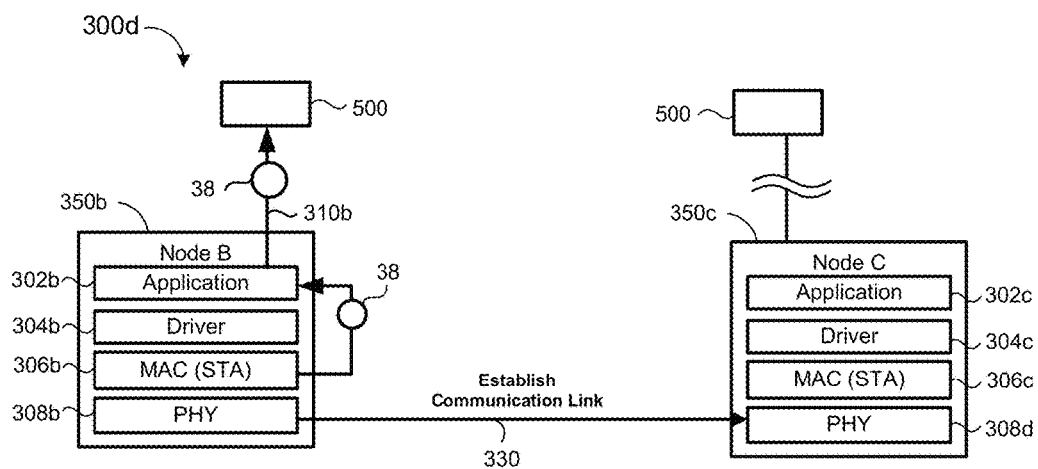
FIG. 3D is a schematic view of a second node notifying a controller that a communication link is established between the second node and a third node.

FIG. 3C shows a schematic view 300c where the second MAC layer 306b executes transmission of the discovery frames 382 from the second PHY layer 308b based on the discovery instructions 36. The discovery instructions 36 may specify one or more BTIs for transmitting the discovery frames 382 via a sector level sweep (SLS) scan. The new third node 350c may operate in a search mode to sweep the scan range across all sectors, and listen for the discovery frames 382. While the example of FIG. 3C only depicts the second node 350b transmitting discovery frames 382, the search mode corresponds to the new third node 350c executing a SLS scan for any discovery frames 382 that nodes 350 connected to the network 200 and within the neighborhood of the new third node 350c transmit. Referring to FIG. 3D, schematic view 300d shows the second node 350b establishes a wireless communication link 330 with the third node 350b when the third node 350b captures one of the discovery frames 382. The discovery frame 382 captured by the new third node 350c may carry necessary information and capabilities to enable the third node 350c to connect to the mesh network 200 and eventually to the controller 500. Moreover, the second application layer 302a may determine the RA associated with the third node 350c based on the sector associated with the captured discovery frame 382.

Figure 3E:
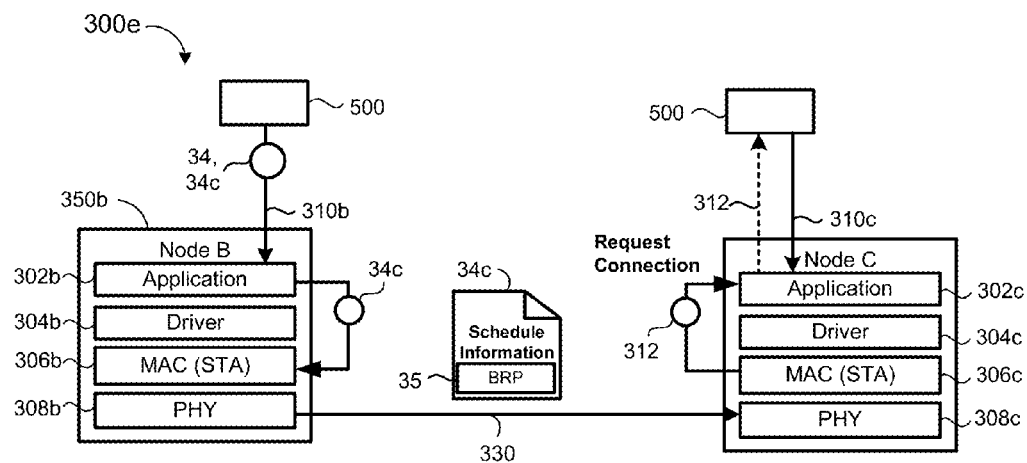
FIG. 3E is a schematic view of a controller transmitting to a second node schedule information for a third node and the second node transmitting the schedule information to the third node.

Referring to FIG. 3E, in some implementations, when the wireless communication link 330 is established between the second node 350b and the third node 350c, schematic view 300e shows the controller 500 transmitting schedule information 34, 34c associated with the third node 350c to the second software application layer 302b of the second node 350b. In these implementations, the second software application layer 302b provides the schedule information 34c to the second MAC layer 306b, instructing the second MAC layer 306b to transmit the schedule information 34c via the communication link 330 to a third MAC layer 306c associated with the third node 350c. In other words, the controller 500 is instructing the second node 350b to behave like a PCP/AP to communicate with the third MAC layer 306c of the third node 350b until the third 350c connects to the controller 500. The scheduling information 34c received by the third node 350c may include a beam refinement protocol (BRP) 35 for optimizing communications with the second node 350b via the communication link 330. Using the captured discovery frame 382 and/or the scheduling information 34c, the third MAC layer 306c may request a third software application layer 302c associated with the third node to transmit a connection request 312 with the controller 500 to establish a node connection 310c between the third node 350c and the controller 500.

Figure 3F:
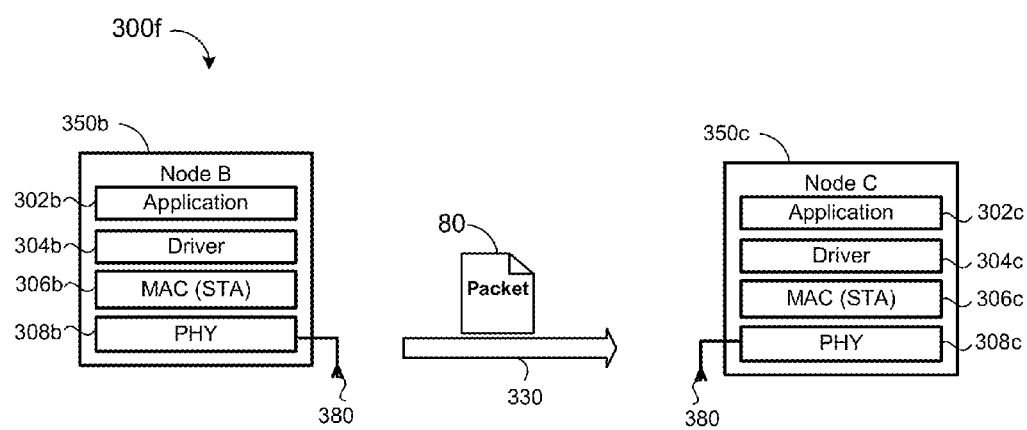
FIG. 3F is a schematic view of a second node transmitting a directional beam containing a data packet and a third node receiving the directional beam.

Referring to FIG. 3F, schematic view 300f shows the second node 350b transmitting the second directional beam containing the data packet 80 to the third node 350c. The scheduling information 34c provided to the third node 350c may specify the second communication period to inform the third node 350c to operate in the receiver mode during the second communication period for receiving the data packet 80 from a specified transmitter (e.g., Node B 350b) during the second communication period. The controller 500 may transmit all future scheduling information 34c associated with the third node 350c to the third software application layer 302c using the node connection 310c. Thereafter, scheduling information 34 from the controller 500 may facilitate one or more subsequent hops of the data packet 80 between node pairs 350 along the identified route 201, 202 until a destination D 220 is reached.

Figure 4:
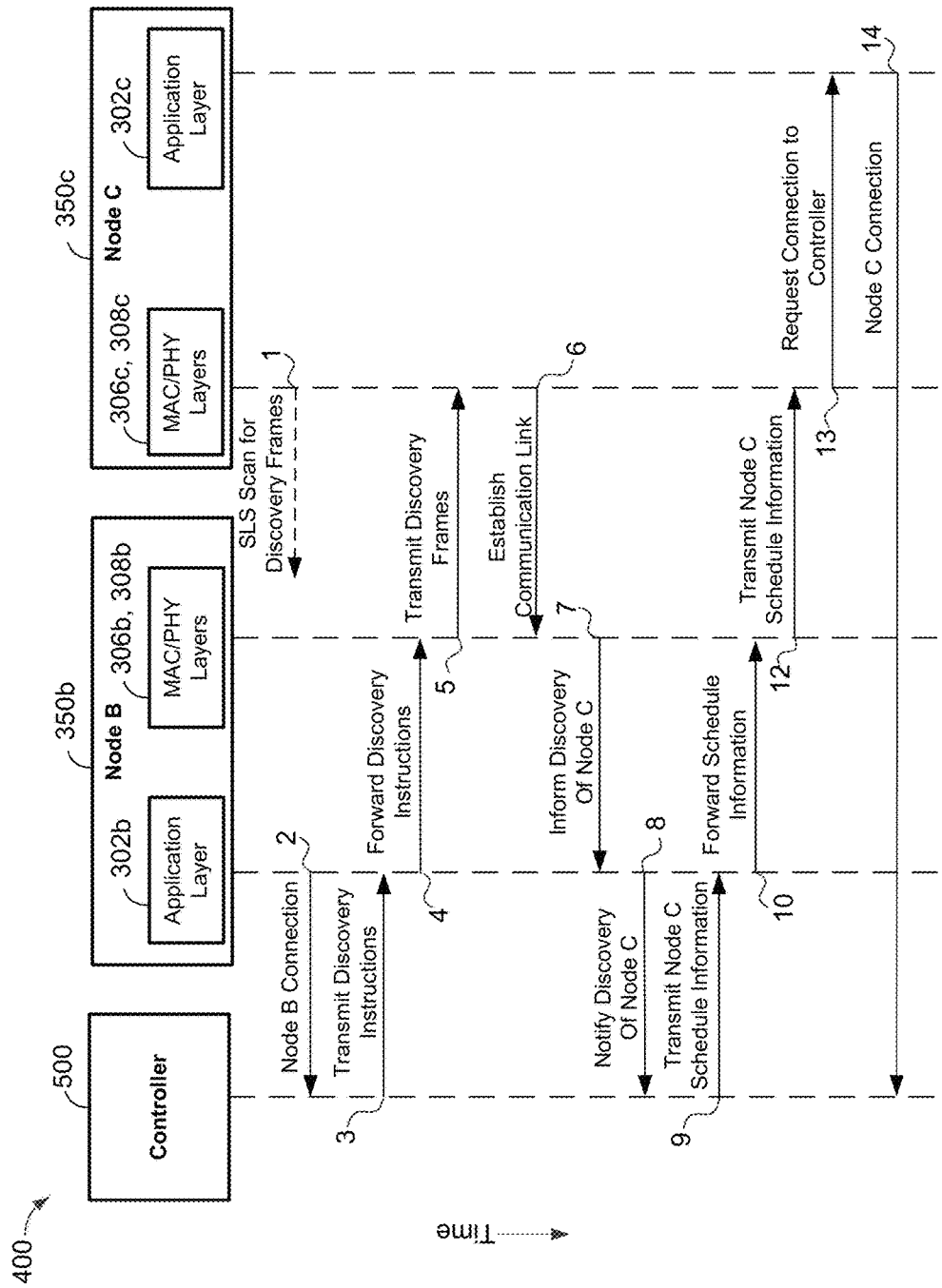
FIG. 4 is a schematic view of example operations performed by a controller when a new node is introduced to a mesh network.

FIG. 4 is a diagram 400 illustrating example operations performed by the controller 500 of the network system 10 when a new third node 350c is introduced to the mesh network 200, but is disconnected from the network 200 and the controller 400. The diagram 500 may be described with reference to FIGS. 3B-3E. The vertical y-axis indicates time increasing from the top to the bottom. At time 1, the third MAC/PHY layers 306c, 308c of the new third mode 350c operate in a search mode by executing a SLS scan for discovery frames 382 transmitted by other nodes 350 connected to the mesh network 200. At time 2 (or a time prior to time 1), the controller 500 receives the node connection 310b from the second software application layer 302b of the second node (Node B). At time 3, the controller 500 transmits discovery instructions 36 to the second software application layer 302b for discovering the third node 350c, and at time 4, the second software application layer 302b forwards the discovery instructions 36 to the second MAC/PHY layers 306b, 308b, causing the second MAC/PHY layers 306b, 308b to execute transmission of discovery frames 382 (FIG. 3C) at time 5. The discovery instructions 36 may specify one or more BTIs for transmitting each of the discovery frames 382 via SLS scanning. When the third MAC/PHY layers 306c, 308c (while operating in the scanning mode) discover/capture one of the discovery frames 382 at time 6, the third node 350c (e.g., at the third MAC/PHY layers 306c, 308c) establishes the communication link 330 with the second node 350b (e.g., at the second MAC/PHY layers 306b, 308b). Subsequently, at time 7, the second MAC/PHY layers 306b, 306b of the second node 350b inform the second software application layer 302b that the third node 350c is discovered (e.g., communication link 330 between the nodes 350b, 350c is established), allowing the second software application layer 302b, at time 8, to notify the controller 500 that the third node 350c is discovered. While the third node 350c is now discovered, the controller 500 and the third node 350c are still disconnected. Accordingly, the controller 400 may route schedule information 34, 34c for the third node 350c through the second node 350b using the node connection 310b and the newly established communication link 350 between the second node 350b and the third node 350c. For instance, at time 9, the controller 500 transmits the schedule information 34c for the third node 350c to the second application layer 302b of the second node 350b, and at time 10, the second application layer 302b forwards the schedule information 34c to the second MAC/PHY layers 306b, 308b, the received schedule information 34c causes the second MAC/PHY layers 306b, 308b, at time 12, to transmit the scheduling information 34c to the third MAC/PHY layers 306c, 308c of the third node 350c. The schedule information 34c received by the third node 350c may include a BRP 35 for optimizing communications (e.g., optimizing the communication link 330) between the second node 350b and the third node 350c. At time 13, the third MAC/PHY layers 306c, 308c of the third node 350c may request the third software application layer 302c to transmit a node connection request 312 to the controller 500. At time 14, the controller 500 receives a node connection 310c from the third node 350c (e.g., at the third software application layer 302c). The controller 500 may provide all future information (e.g., scheduling information 34) directly to the third node 350c via the node connection 310c.

Figure 5:
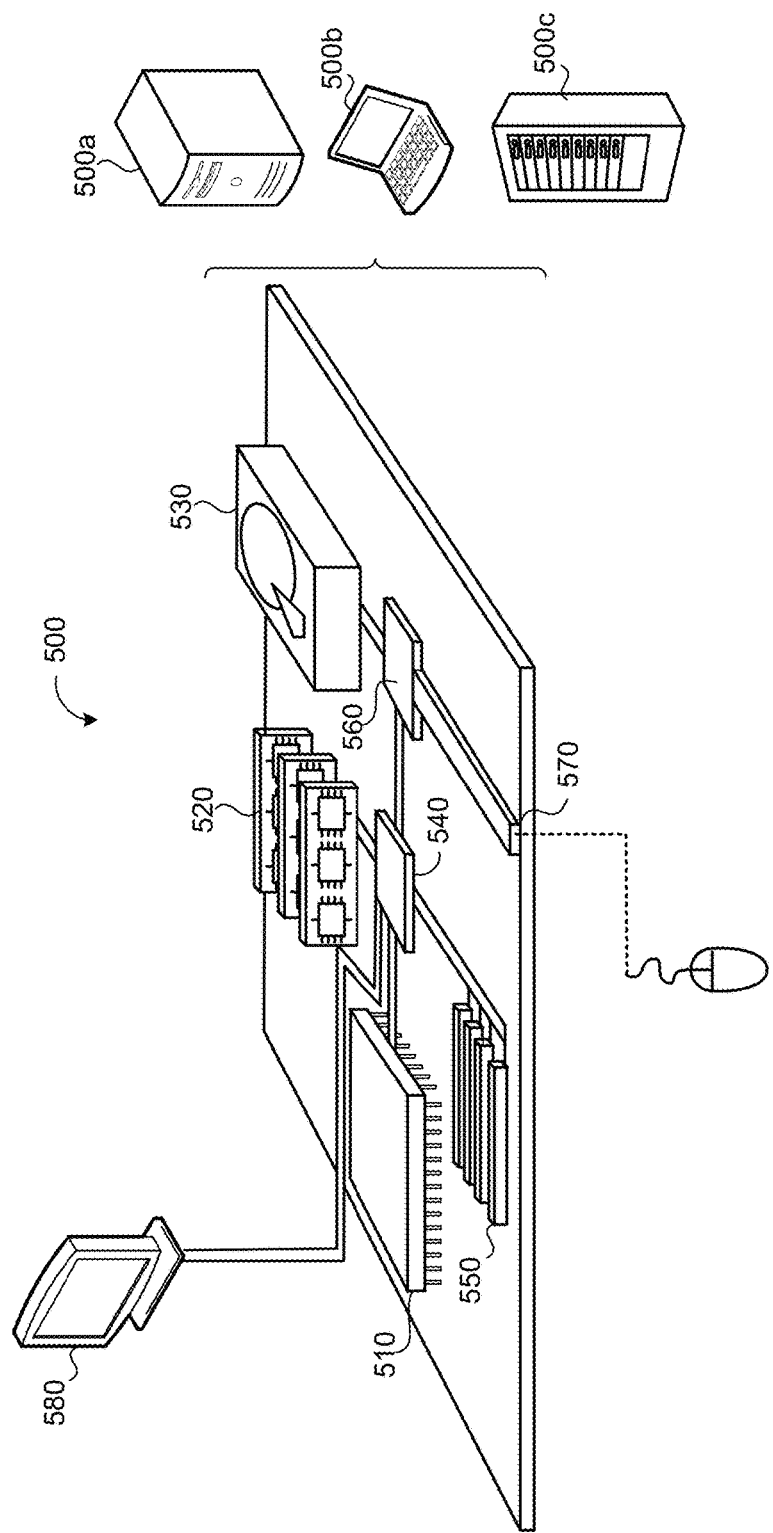
FIG. 5 is schematic view of an example computing device.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor (e.g., data processing hardware) 510, memory hardware 520, a storage device 530, a high-speed interface/controller 540 connecting to the memory hardware 520 and high-speed expansion ports 550, and a low speed interface/controller 560 connecting to low speed bus 570 and storage device 530. Each of the components 510, 520, 530, 540, 550, and 560, are interconnected using various busses, and may be mounted on a common motherboard or in other manners as appropriate. The data processing hardware 510 executes the and can process instructions for execution within the computing device 500, including instructions stored in the memory hardware 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory hardware 520 stores information non-transitorily within the computing device 500. The memory hardware 520 may be a computer-readable medium, a volatile memory unit(s), or non-volatile memory unit(s). The memory hardware 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory hardware 520, the storage device 530, or memory on the data processing hardware 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory hardware 520, the display 580 (e.g., through a graphics processor or accelerator), and to the high-speed expansion ports 550, which may accept various expansion cards (not shown). In some implementations, the low-speed controller 560 is coupled to the storage device 530 and low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be as the controller 500 executing on the remote system 140, as shown in FIGS. 1A-1B. For example, the controller 500 may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, one or more node connections from a mesh network external to the data processing hardware, the mesh network including a network of nodes, each node operating in a station mode, the station mode non-communicative with any direct access point within the mesh network;
   identifying, using the data processing hardware, a route within the mesh network for providing a data packet from a source to a destination;
   determining, using the data processing hardware, schedule information associated with the identified route, the schedule information coordinating wireless communication between at least a first node and a second node along the route to transfer the data packet, the schedule information specifying a first beacon transmission interval and a first communication period for transmitting the data packet from the first node to the second node; and
   providing, using the data processing hardware, the schedule information to the first node and the second node, the scheduling information, when provided to the first node and the second node, instructing a first media access control layer of the first node to operate in a transmitter mode and a second media access control layer of the second node to operate in a receiving mode to execute beam tracking during the first beacon transmission interval to determine a first directional beam for transmitting the data packet from the first node to the second node during the first communication period.

2. The method of claim 1, wherein providing the schedule information to the first node and the second node comprises:
   transmitting the schedule information from the data processing hardware to a first application layer associated with the first node, the first application layer providing the schedule information to the first media access control layer associated with the first node; and
   transmitting the schedule information from the data processing hardware to a second application layer associated with the second node, the second application layer providing the schedule information to the second media access control layer associated with the second node.

3. The method of claim 1, wherein providing the schedule information to the first node and the second node comprises:
   transmitting the schedule information from the data processing hardware to a first application layer associated with the first node, the first application layer providing the schedule information to the first media access control layer associated with the first node; and
   instructing the first node to transmit the schedule information to the second node using a wireless communication link between the first media access control layer and the second media access control layer associated with the second node.

4. The method of claim 1, further comprising:
   when the second node is disconnected from the mesh network:
      transmitting discovery instructions from the data processing hardware to a first application layer associated with the first node for discovering the second node, the received discovery instructions causing the first media access control layer associated with the first node to:
         execute transmission of discovery frames to enable the second node operating in a station scanning mode to discover the first node;
         establish a wireless communication link with the second node when the second node discovers one or more of the discovery frames; and
         inform the first application layer to notify the data processing hardware that the wireless communication link is established between the first node and the second node.

5. The method of claim 4, wherein the first media access control layer executes the transmission of discovery frames using a sector level sweep during one or more beacon transmission intervals specified by the discovery instructions.

6. The method of claim 4, further comprising:
   when the wireless communication link is established between the first node and the second node:
      transmitting the schedule information from the data processing hardware to the first node; and
      instructing, using the data processing hardware, the first node to transmit the schedule information to the second node.

7. The method of claim 1, wherein:
   the mesh network comprises a mmWave mesh network;
   the first node includes a first PHY layer interoperable with the first media access control layer and employing one or more antennas to transmit the first directional beam containing the data packet to the first node during the first communication period, the first PHY layer and the first media access control layer residing on a first IEEE 802.11ad wireless chipset of the first node; and
   the second node includes a second PHY layer interoperable with the second media access control layer and employing one or more antennas to receive the first directional beam containing the data packet from the second node during the first communication period, the second PHY layer and the second media access control layer residing on a second IEEE 802.11ad wireless chipset of the second node.

8. The method of claim 1, wherein the scheduling information provided to the second node further specifies a second communication period and instructs the second media access control layer to operate in the transmitter mode to transmit a second directional beam containing the data packet to a third node during the second communication period after the second node receives the data packet from the first node.

9. The method of claim 8, wherein a software application layer associated with the second node inspects a destination address within the received data packet to determine a receiver address associated the third node, and the second media access control layer uses the receiver address associated with the third node to transmit the second directional beam.

10. The method of claim 9, wherein the software application layer associated with the second node uses the receiver address associated with the third node to select a transmitter address associated with an optimal sector of the second media access control layer for transmitting the second directional beam.

11. The method of claim 9, wherein the received data packet includes one of the following data frame formats:
a first data frame format including the receiver address, a transmitter address, the destination address, and a source address in a same header;
a second data frame format including the receiving address and the transmitter address in a 802.11ad header and the source address and the destination address included as a special header or in a special field of a payload portion; or
a third data frame format including the destination address and the source address encapsulated in an aggregated-Media Access Control Service Data Unit.

12. The method of claim 1, wherein the first media access control layer and the second media access control layer contend with each other to determine which one of the first node or the second node will operate in the transmitter mode during the first communication period.

13. The method of claim 1, wherein media access control layers associated with the nodes of the mesh network execute contention-based access period procedures when contending with other nodes in the mesh network.

14. The method of claim 1, wherein media access control layers associated with the nodes of the mesh network update beam tracking to optimize multi-hop wireless communication links.

15. The method of claim 1, wherein the scheduling information comprises multi-hop schedule information and includes at least one of:
a selected channel for transmitting the data packet associated with each hop along the route;
one or more beacon transmission interval associated with each hop along the route; or
communication periods for transferring the data packet between selected node pairs along the route.

16. A network system comprising:
data processing hardware external to a mesh network, the mesh network including a network of nodes, each node operating in a station mode, the station mode non-communicative with any direct access point within the mesh network;
memory hardware in communication with the data processing hardware, the memory hardware storing instructions that when executing on the data processing hardware cause the data processing hardware to perform operations comprising:
receiving one or more node connections from the mesh network;
identifying a route within the mesh network for providing a data packet from a source to a destination;
determining schedule information associated with the identified route, the schedule information coordinating wireless communication between at least a first node and a second node along the route to transfer the data packet, the schedule information specifying a first beacon transmission interval and a first communication period for transmitting the data packet from the first node to the second node; and
providing the schedule information to the first node and the second node, the scheduling information, when provided to the first node and the second node, instructing a first media access control layer of the first node to operate in a transmitter mode and a second media access control layer of the second node to operate in a receiving mode to execute beam tracking during the first beacon transmission interval to determine a first directional beam for transmitting the data packet from the first node to the second node during the first communication period.

17. The system of claim 16, wherein providing the schedule information to the first node and the second node comprises:
transmitting the schedule information from the data processing hardware to a first application layer associated with the first node, the first application layer providing the schedule information to the first media access control layer associated with the first node; and
transmitting the schedule information from the data processing hardware to a second application layer associated with the second node, the second application layer providing the schedule information to the second media access control layer associated with the second node.

18. The system of claim 16, wherein providing the schedule information to the first node and the second node comprises:
transmitting the schedule information from the data processing hardware to a first application layer associated with the first node, the first application layer providing the schedule information to the first media access control layer associated with the first node; and
instructing the first node to transmit the schedule information to the second node using a wireless communication link between the first media access control layer and the second media access control layer associated with the second node.

19. The system of claim 16, wherein the operations further comprise:
when the second node is disconnected from the mesh network:
transmitting discovery instructions from the data processing hardware to a first application layer associated with the first node for discovering the second node, the received discovery instructions causing the first media access control layer associated with the first node to:
execute transmission of discovery frames to enable the second node operating in a station scanning mode to discover the first node;
establish a wireless communication link with the second node when the second node discovers one or more of the discovery frames; and
inform the first application layer to notify the data processing hardware that the wireless communication link is established between the first node and the second node.

20. The system of claim 19, wherein the first media access control layer executes the transmission of discovery frames using a sector level sweep during one or more beacon transmission intervals specified by the discovery instructions.

21. The system of claim 19, wherein the operations further comprise:
when the wireless communication link is established between the first node and the second node:
transmitting the schedule information from the data processing hardware to the first node; and
instructing, using the data processing hardware, the first node to transmit the schedule information to the second node.

22. The system of claim 16, wherein:
the mesh network comprises a mmWave mesh network;
the first node includes a first PHY layer interoperable with the first media access control layer and employing one or more antennas to transmit the first directional beam containing the data packet to the first node during the first communication period, the first PHY layer and the first media access control layer residing on a first IEEE 802.11ad wireless chipset of the first node; and
the second node includes a second PHY layer interoperable with the second media access control layer and employing one or more antennas to receive the first directional beam containing the data packet from the second node during the first communication period, the second PHY layer and the second media access control layer residing on a second IEEE 802.11ad wireless chipset of the second node.

23. The system of claim 16, wherein the scheduling information provided to the second node further specifies a second communication period and instructs the second media access control layer to operate in the transmitter mode to transmit a second directional beam containing the data packet to a third node during the second communication period after the second node receives the data packet from the first node.

24. The system of claim 23, wherein a software application layer associated with the second node inspects a destination address within the received data packet to determine a receiver address associated the third node, and the second media access control layer uses the receiver address associated with the third node to transmit the second directional beam.

25. The system of claim 24, wherein the received data packet includes one of the following data frame formats:
a first data frame format including the receiver address, a transmitter address, the destination address, and a source address in a same header;
a second data frame format including the receiving address and the transmitter address in a 802.11ad header and the source address and the destination address included as a special header or in a special field of a payload portion; or
a third data frame format including the destination address and the source address encapsulated in an aggregated-Media Access Control Service Data Unit.

26. The system of claim 24, wherein the software application layer associated with the second node uses the receiver address associated with the third node to select a transmitter address associated with an optimal sector of the second media access control layer for transmitting the second directional beam.

27. The system of claim 16, wherein the first media access control layer and the second media access control layer contend with each other to determine which one of the first node or the second node will operate in the transmitter mode during the first communication period.

28. The system of claim 16, wherein media access control layers associated with the nodes of the mesh network execute contention-based access period procedures when contending with other nodes in the mesh network.

29. The system of claim 16, wherein media access control layers associated with the nodes of the mesh network update beam tracking to optimize multi-hop wireless communication links.

30. The system of claim 16, wherein the scheduling information comprises multi-hope scheduling information and includes at least one of:
a selected channel for transmitting the data packet associated with each hop along the route;
one or more beacon transmission interval associated with each hop along the route; or
communication periods for transferring the data packet between selected node pairs along the route.

* * * * *